Oct. 18, 1932.  F. W. COTTERMAN  1,883,736
METHOD OF MAKING COMMUTATORS
Filed May 23, 1929
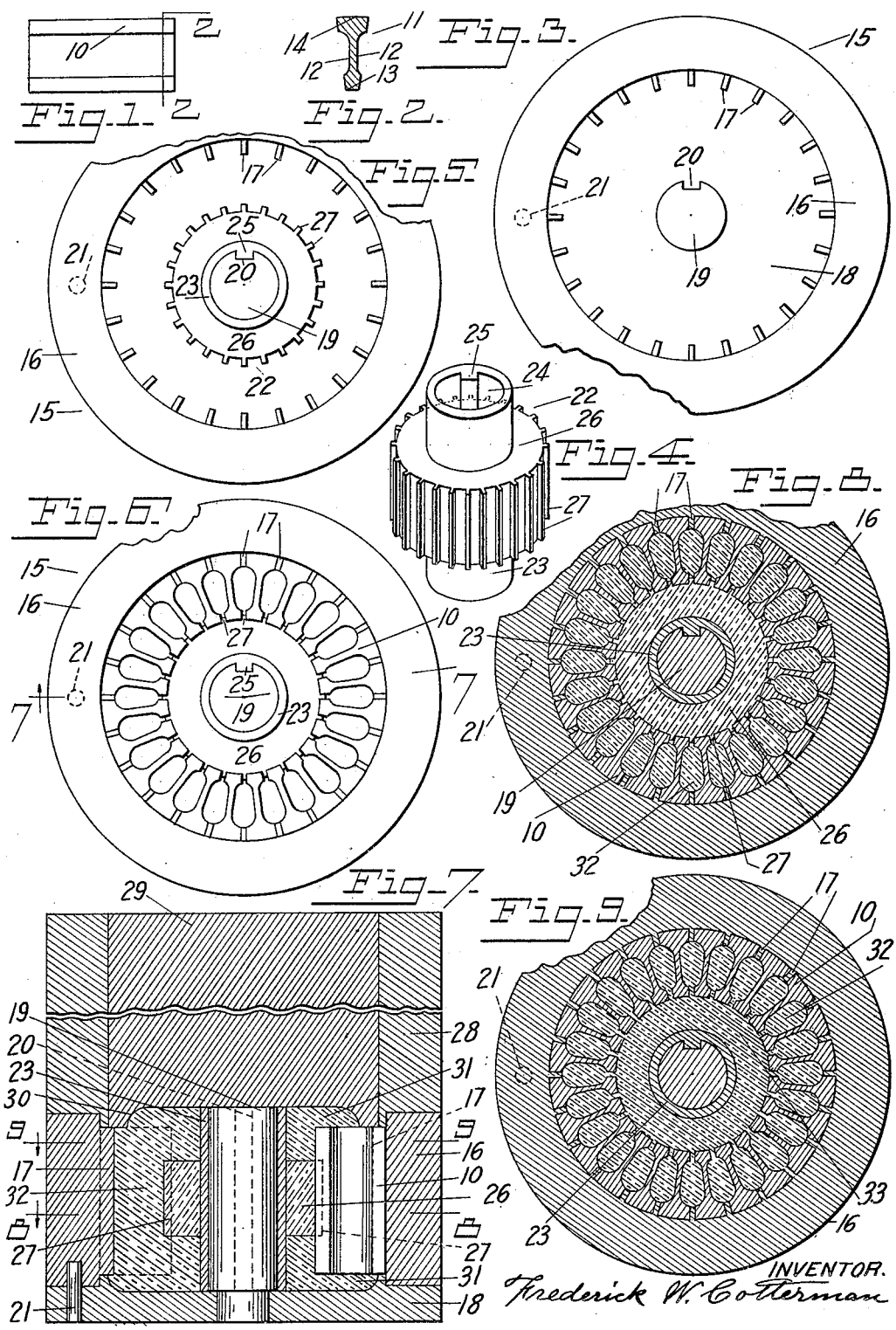
INVENTOR.
Frederick W. Cotterman Patented Oct. 18, 1932

1,883,736

UNITED STATES PATENT OFFICE

FREDERICK W. COTTERMAN, OF DAYTON, OHIO, ASSIGNOR TO VINCENT G. APPLE LABORATORIES, OF DAYTON, OHIO

METHOD OF MAKING COMMUTATORS

Application filed May 23, 1929. Serial No. 365,490.

This invention relates to commutators such as are used in dynamo electric machines, and specifically to that type wherein a plurality of segments of conductive material are held in spaced apart relation by a core of insulation molded in situ about them.

An object of the invention is to generally improve a structure of this type.

Another object is to provide an improved procedure for making a commutator of this class.

A more specific object is to provide adequate temporary spacing means to hold the segments in correct relation to each other until a core of plastic insulation may be pressed through and about them and solidified.

Further objects will become apparent as the invention is described in detail and reference is made to the drawing wherein, Fig. 1 is a side view of one of the commutator segments made by cutting a drawn bar of conductive material into lengths.

Fig. 2 is a transverse section through the segment, taken at 2—2 of Fig. 1.

Fig. 3 is a top view of a portion of a mold comprising a base with a center plug, and a ring having short inwardly extending spacing tangs; between which the segments are placed to hold their outer edges spaced apart while a core of insulation is being molded between and about them.

Fig. 4 shows a pre-molded hub partly composed of insulation which has short outwardly extending spacing tangs and is employed in conjunction with the spacing ring of the mold, but which is adapted to hold the extreme inner edges of the segments spaced while the spacing ring of the mold holds the extreme outer edges.

Fig. 5 shows the part of the mold shown in Fig. 3 but with the premolded hub Fig. 4 in place.

Fig. 6 shows a set of segments Fig. 2 in the mold which has the premolded hub in place as shown in Fig. 5.

Fig. 7 is a vertical axial section through a complete mold after a core of insulation has been molded about the segments and about the premolded hub.

Fig. 8 is a transverse section taken at 8—8 of Fig. 7.

Fig. 9 is a transverse section taken at 9—9 of Fig. 7.

Similar numerals refer to similar parts throughout the several views.

Segments 10 Figure 1, are provided by cutting them off of a bar or wire having a cross-sectional contour as at 11 Figure 2. Grooves 12 extend lengthwise of the wire in each side leaving a small keystone shaped part 13 at the inner edge and a relatively large keystone shaped part 14 at the outer edge.

In the mold 15 the ring 16 has short inwardly extending spacing tangs 17 corresponding in number to the number of segments in the commutator to be molded. Extending upwardly from the base 18 is the center plug 19, which has a keyway 20. A pin 21 locates the spacing ring 16 in a definite relation to base 18 whereby keyway 20 and spacing tangs 17 are kept in a definite rotative relation one to the other.

Fig. 4 is a perspective view of the hub 22 which is provided to help the mold ring 16 to keep the segments spaced apart in the mold 15 until the core may be molded about them. It consists of a tubular portion 23, preferably of metal, having a hole 24 and an inwardly projecting key 25 extending lengthwise therethrough. Tubular part 23 is preferably as long as the commutator which is to be made. The part 26 is composed of insulation, is preferably considerably shorter than tubular part 23, and is preferably molded about tubular part 23, which may be knurled or otherwise roughened where the insulation and the metal join. Part 26 has a series of short outwardly extending spacing tangs 27 corresponding in number to the number of segments in the commutator which is to be made. When a hub 22 is placed over the center plug 19 the spacing tangs 27 are in the same radial plane as the spacing tangs 17 of the spacing ring 15.

Fig. 5 shows a hub 22 placed over the center plug 19 in mold 15. The mold is now prepared to receive the segments 10.

Fig. 6 shows the mold 15 with a set of segments 10 held spaced apart by the short spacing tangs 17 of the ring 16 and the short spacing tangs 27 of part 26.

When the mold body 16 has been filled with segments 10 as shown in Fig. 6 the stock ring 28 (see Fig. 7) is placed on top of the spacing ring 16, the mold and segments are heated, a quantity of insulation is put into the stock ring and forced downward by plunger 29 to compose a core 30, which extends inwardly to tube 23 at the ends and to the short spacing tangs 27 in the middle portion, and between the segments outwardly until restricted by tangs 17 and endwise until it terminates in the hubs 31.

The transverse section Fig. 8 shows that portion of the molded core which joins up with the premolded part 26 which was inserted to keep the inner edges of the segments spaced apart one from another, while the transverse section Fig. 9 shows that portion of the molded core which is continuous from the tube 23 outwardly between the segments to the short spacing tangs 17 whereby the segments are not only spaced apart but are held against the tendency to move radially outward when the commutator rotates. Where grooves 12 extend lengthwise through the segments the insulation widens to compose the ties 32 all of which integrally join the ring 33 at their inner edges as well as the hubs 31 at the ends.

It will be apparent that the advantages of holding the inner edges of the segments spaced apart while molding is being effected become greater as the segments have greater radial depth and less circumferential thickness, for the inner keystone shaped parts 13 of the segments may not be adequately held against circumferential movement by the short spacing tangs 17 because these tangs are radially removed from the inner keystone shaped parts to too great an extent. In consequence a commutator such as I show may not be molded without holding the inner edges of the segments spaced apart while molding of the core is taking place, because of the ease with which the inner edges of adjacent segments may be crowded toward each other and thereby come into electrical contact regardless of the fact that the extreme outer edges are held spaced apart.

And while I have shown an embodiment of my invention wherein certain forms of segments are used, obviously my method may be advantageously employed to keep the inner edges of segments spaced apart while the core material is being forced therebetween whenever they are of the radially deep circumferentially narrow type, and while the means which I show to hold the inner edges of the segments spaced apart consists of a hub of metal covered with insulation and inserted at the middle part of the segments this part may be made entirely of insulation and may be inserted at one end of the segments. Thus a washer punched from sheet insulation with proper locating tangs extending outwardly therefrom would accomplish the purpose of the invention if placed at one end of the segments so as to hold their inner ends spaced apart while the molding of the core was being effected.

Having described my invention, I claim—

1. The method of making a commutator comprising a plurality of circumferentially thin radially deep segments, in a mold having a metal spacing ring with short inwardly extending spacing tangs, which consists of concentrically locating a hub of insulation having short outwardly extending spacing tangs in the spacing ring, placing the segments in the mold with the inwardly extending spacing tangs separating the outer edges of the segments and the outwardly extending spacing tangs separating the inner edges of the segments, molding a core of insulation between and about the segments and about the hub, hardening the core, then removing the spacing ring.

2. The method of making a commutator comprising a plurality of circumferentially thin radially deep segments, in a mold having a metal spacing ring with short inwardly extending spacing tangs, which consists of molding a hub of insulation with short outwardly extending spacing tangs, concentrically locating said hub in the spacing ring with the tangs of the hub in the same radial planes as the tangs of the ring, placing the segments in the mold with the tangs of the spacing ring separating the segments at their outer edges and the tangs of the hub separating them at their inner edges, molding a core of insulation between and about the segments and about the hub, hardening the core, then removing the spacing ring.

3. The method of making a commutator comprising a plurality of metal segments held in circumferentially spaced apart relation in a core of insulation, which consists of arranging the segments in the form of a cylindrical ring within a mold, keeping them circumferentially spaced apart by holding them at both their outer and their inner edges, leaving the greater part of the space between them vacant, pressure molding the core of insulation within the said ring and into the said vacant spaces while the segments are still held spaced apart at both their outer and inner edges, and hardening said core.

4. The method of making a commutator comprising a ring of metal segments held in circumferentially spaced apart relation in a core of insulation, which consists of applying a holding means to both the inner and the outer edges of the segments to hold them in circumferentially spaced apart relation, said holding means leaving the greater portion of the space between the segments vacant, and forcing insulation by heavy pressure into the ring and radially outward into the said vacant spaces while said segments are still being held at both their outer and their inner edges.

In testimony whereof, I hereunto set my hand.

FREDERICK W. COTTERMAN.